(12) United States Patent
Borovikov et al.

(10) Patent No.: US 11,574,557 B1
(45) Date of Patent: Feb. 7, 2023

(54) EDUTAINMENT OVERLAY FOR LEARNING FOREIGN LANGUAGES IN VIDEO GAMES

(71) Applicant: Electronic Arts Inc., Redwood City, CA (US)

(72) Inventors: Igor Borovikov, Foster City, CA (US); Mohsen Sardari, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/393,327

(22) Filed: Aug. 3, 2021

(51) Int. Cl.
*G09B 19/06* (2006.01)
*G09B 7/06* (2006.01)

(52) U.S. Cl.
CPC ............. *G09B 19/06* (2013.01); *G09B 7/06* (2013.01)

(58) Field of Classification Search
CPC .................................. G09B 19/06; G09B 7/06
USPC ........................................................... 434/18
See application file for complete search history.

(56) References Cited

U.S. PATENT DOCUMENTS

| | | | |
|---|---|---|---|
| 6,769,918 B1 * | 8/2004 | God | A63F 13/10 434/365 |
| 2005/0089834 A1 * | 4/2005 | Shapiro | G09B 7/00 434/323 |
| 2014/0178852 A1 * | 6/2014 | Colar | A63F 13/80 434/362 |

* cited by examiner

*Primary Examiner* — Thomas J Hong
(74) *Attorney, Agent, or Firm* — McDermott Will & Emery LLP

(57) ABSTRACT

Various aspects of the subject technology relate to systems, methods, and machine-readable media for learning a foreign language. The method includes executing a video game in a first human language. The method includes pausing gameplay of the video game for a paused time instance. The method includes executing a digital mini-puzzle game during the paused time instance in the gameplay of the video game, the digital mini-puzzle game executed in a second human language, the digital mini-puzzle game executed utilizing assets of the video game. The method includes receiving a response to the digital mini-puzzle game from a player-computing device corresponding to a player, the response comprising at least one of the first human language and/or the second human language. The method includes determining a score of the response corresponding to the player based at least in part on a comparison of the response with translation pairs in a database.

12 Claims, 5 Drawing Sheets

EDUTAINMENT OVERLAY FOR LEARNING FOREIGN LANGUAGES IN VIDEO GAMES

BACKGROUND

Educational entertainment (edutainment) includes media that is designed to educate through entertainment. Edutainment commonly includes content that is intended to teach, which also has incidental entertainment value. It is well-known that being entertained increases learning and engagement, and so edutainment techniques have been used by academia, corporations, governments, and other entities in various countries to disseminate information in classrooms and/or via television, radio, and other media for learning purposes.

BRIEF SUMMARY

The subject disclosure provides for systems and methods for an edutainment overlay for learning foreign languages in video games. In an aspect, an automated (e.g., artificial intelligence (AI)-driven) system may generate mini-puzzles from game content that challenges a player's knowledge of a selected language. According to aspects, the puzzles may be based on an option selection in text mode, or may include visual puzzles that challenge a player to find an object by its name in the foreign language in a current stop-frame. For games that enable microphone input, the game may ask the player to repeat a phrase in the foreign language. In an implementation, the pronunciation may be rated. According to aspects, the system may function like a dedicated language learning tool. For example, the content may be created automatically from the game assets, including localized dialog lines, object names and their tags in the game assets, existing dictionaries and automated translation systems, etc. In an implementation, the overlay may be optional, tunable, and may be created automatically via an augmented game engine and its user experience (UX) design.

According to one embodiment of the present disclosure, a computer-implemented method for learning a foreign language is provided. The method includes executing a video game in a first human language. The method also includes pausing gameplay of the video game for a paused time instance. The method also includes executing a digital mini-puzzle game during the paused time instance in the gameplay of the video game, the digital mini-puzzle game executed in a second human language different from the first human language, the digital mini-puzzle game executed utilizing assets of the video game. The method also includes receiving a response to the digital mini-puzzle game from a player-computing device corresponding to a player, the response comprising at least one of the first human language and/or the second human language. The method also includes determining a score of the response corresponding to the player based at least in part on a comparison of the response with translation pairs in a database. The method also includes causing display of an output based on the score.

According to one embodiment of the present disclosure, a system is provided including a processor and a memory comprising instructions stored thereon, which when executed by the processor, causes the processor to perform a method for learning a foreign language. The method includes executing a video game in a first human language. The method also includes pausing gameplay of the video game for a paused time instance. The method also includes executing a digital mini-puzzle game during the paused time instance in the gameplay of the video game, the digital mini-puzzle game executed in a second human language different from the first human language, the digital mini-puzzle game executed utilizing assets of the video game. The method also includes receiving a response to the digital mini-puzzle game from a player-computing device corresponding to a player, the response comprising at least one of the first human language and/or the second human language. The method also includes determining a score of the response corresponding to the player based at least in part on a comparison of the response with translation pairs in a database. The method also includes causing display of an output based on the score.

According to one embodiment of the present disclosure, a non-transitory computer-readable storage medium is provided including instructions (e.g., stored sequences of instructions) that, when executed by a processor, cause the processor to perform a method for learning a foreign language. The method includes executing a video game in a first human language. The method also includes pausing gameplay of the video game for a paused time instance. The method also includes executing a digital mini-puzzle game during the paused time instance in the gameplay of the video game, the digital mini-puzzle game executed in a second human language different from the first human language, the digital mini-puzzle game executed utilizing assets of the video game. The method also includes receiving a response to the digital mini-puzzle game from a player-computing device corresponding to a player, the response comprising at least one of the first human language and/or the second human language. The method also includes determining a score of the response corresponding to the player based at least in part on a comparison of the response with translation pairs in a database. The method also includes causing display of an output based on the score.

According to one embodiment of the present disclosure, a system is provided that includes means for storing instructions, and means for executing the stored instructions that, when executed by the means, cause the means to perform a method for learning a foreign language. The method includes executing a video game in a first human language. The method also includes pausing gameplay of the video game for a paused time instance. The method also includes executing a digital mini-puzzle game during the paused time instance in the gameplay of the video game, the digital mini-puzzle game executed in a second human language different from the first human language, the digital mini-puzzle game executed utilizing assets of the video game. The method also includes receiving a response to the digital mini-puzzle game from a player-computing device corresponding to a player, the response comprising at least one of the first human language and/or the second human language. The method also includes determining a score of the response corresponding to the player based at least in part on a comparison of the response with translation pairs in a database. The method also includes causing display of an output based on the score.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
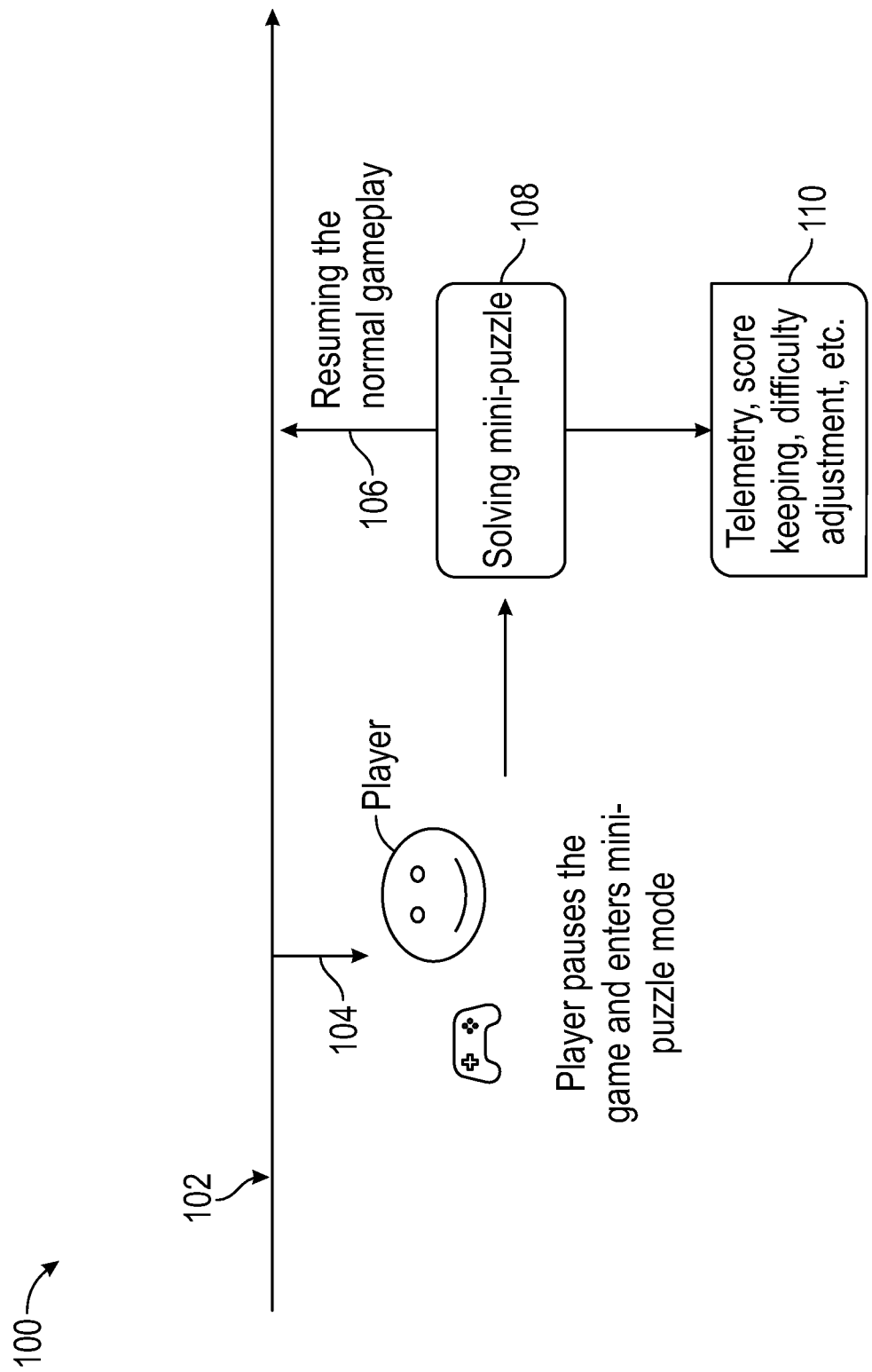
FIG. 1 illustrates an exemplary process flow for learning a foreign language through a video game, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Educational entertainment (edutainment) includes media that is designed to educate through entertainment. Edutainment commonly includes content that is intended to teach, which also has incidental entertainment value. It is well-known that being entertained increases learning and engagement, and so edutainment techniques have been used by academia, corporations, governments, and other entities in various countries to disseminate information in classrooms and/or via television, radio, and other media for learning purposes.

The subject disclosure provides for systems and methods for an edutainment overlay for learning foreign languages in video games. In an aspect, an automated (e.g., artificial intelligence (AI)-driven) system may generate mini-puzzles from game content that challenges a player's knowledge of a selected language. According to aspects, the puzzles may be based on an option selection in text mode, or may include visual puzzles that challenge a player to find an object by its name in the foreign language in a current stop-frame. For games that enable microphone input, the game may ask the player to repeat a phrase in the foreign language. In an implementation, the pronunciation may be rated. According to aspects, the system may function like a dedicated language learning tool. For example, the content may be created automatically from the game assets, including localized dialog lines, object names and their tags in the game assets, existing dictionaries and automated translation systems, etc. In an implementation, the overlay may be optional, tunable, and may be created automatically via an augmented game engine and its user experience (UX) design.

According to aspects, during normal gameplay flow, a dialog line from the story is presented to a player in the pre-selected foreign language. In an implementation, the game has an option to pause and allow the player to solve a mini-puzzle. For example, the mini-puzzle may ask the player to select the right article, suffix or a correct word from a list of several options, place words in the correct order, etc.

According to aspects, during exploratory game play, a player has an option to pause the game and select objects in the scene using a foreign word prompt. Alternatively, an object in the scene may be selected, and the player may be asked to choose the correct word for the object in the foreign language.

The disclosed system addresses a problem in traditional video games tied to computer technology, namely, the technical problem of communicating in a foreign language to a player. The disclosed system solves this technical problem by providing a solution also rooted in computer technology, namely, by providing for an edutainment overlay for learning foreign languages in video games. The disclosed system also improves the functioning of the computer itself because it saves data storage space, reduces system loading times, and reduces the cost of system resources.

FIG. 1 illustrates an exemplary process flow 100 for learning a foreign language (e.g., a foreign human language) through a video game, according to certain aspects of the present disclosure. The process flow 100 may include a gameplay timeline 102. For example, the gameplay timeline 102 may include a progression of a player through a video game.

According to aspects, the player may pause the game 104 for a paused time instance while progressing through the timeline 102 of the video game. Upon pausing the game, the video game application may automatically enter a mini-puzzle mode. For example, the user may have toggled an option to allow generation of an edutainment overlay for learning foreign languages. The player may also have selected a foreign language to learn. Alternatively, the mini-puzzle may automatically be generated during normal pauses in gameplay. For example, in a role-playing game where choosing between different dialogue choices affects the outcome of the game, the mini-puzzle may be presented in lieu of the standard dialogue. It is understood that any foreign language may be selected for learning without departing from the scope of the disclosure. The mini-puzzle may include at least one of a digital mini-puzzle game, a digital mini-puzzle video game, a mini-puzzle video game, and/or the like.

According to aspects, an edutainment overlay may be generated by utilizing native resources of the video game application. The edutainment overlay may include a mini-puzzle to be solved by the player. For example, the mini-puzzle may be a word mini-puzzle or a visual mini-puzzle. A word mini-puzzle may include selecting a word from a list of words. For example, if the player is a native English speaker and wishes to learn Spanish, the word mini-puzzle may ask the player to select a Spanish word to complete a sentence in Spanish. The word mini-puzzle may be generated based on in-game assets, and so content of the word mini-puzzle may be related to the content of the video game.

According to aspects, a visual mini-puzzle may include identifying an in-game object in a foreign language. For example, if the player is a native English speaker and wishes to learn Spanish, the visual mini-puzzle may prompt the player in Spanish to select a specific object in the paused gameplay. In an implementation, the visual puzzle may also randomly select an object and ask the player to provide the name of the object in Spanish.

It is understood in the above that Spanish is included as an example only, and any other foreign language may be similarly implemented as described herein without departing from the scope of the disclosure.

According to aspects, once the player has solved/responded to the mini-puzzle 108 (e.g., the player provides a response), the system tracks the performance of the player (e.g., through telemetry of the video game, etc.) 110. For example, the player may be given a score for their performance. If the player has shown improvement (e.g., consistently high scores), a difficulty level of the mini-puzzle may be increased. Similarly, if the player has not shown improvement (e.g., consistently low scores/below a threshold, etc.), the difficulty level of the mini-puzzle may be maintained or lowered. After the mini-puzzle is completed, the normal gameplay may resume 106.

According to aspects, the video game telemetry may be utilized to collect a number of correct answers, wrong answers, tag particular words, sentences, or other elements of the game to determine if the language is successfully learned or still a work in progress. In an implementation, a progress of the player in learning the new language may be tracked and included in a leaderboard. For example, players may compete against each other to see who can learn a new language the fastest, perform the best on the mini-puzzles, etc.

According to aspects, an automated (e.g., artificial intelligence (AI)-driven) system may generate mini-puzzles from game content that challenges a player's knowledge of a selected language. According to aspects, the puzzles may be based on an option selection in text mode, or may include visual puzzles that challenge a player to find an object by its name in the foreign language in a current stop-frame.

According to aspects, for games that enable microphone input, the game may ask the player to repeat a phrase in the foreign language. In an implementation, the pronunciation may be rated. According to additional aspects, the system may function like a dedicated language learning tool. For example, the content may be created automatically from the game assets, including localized dialog lines, object names and their tags in the game assets, existing dictionaries and automated translation systems, etc. In an implementation, the overlay may be optional, tunable, and may be created automatically via an augmented game engine and its user experience (UX) design.

According to aspects, during normal gameplay flow, a dialog line from the story may be presented to a player in the pre-selected foreign language. In an implementation, the game has an option to pause and allow the player to solve a mini-puzzle. For example, the mini-puzzle may ask the player to select the right article, suffix or a correct word from a list of several options, place words in the correct order, etc.

According to aspects, during exploratory game play, a player may have an option to pause the game and select objects in the scene using a foreign word prompt. According to additional aspects, an object in the scene may be selected, and the player may be asked to choose the correct word for the object in the foreign language.

According to aspects, the language games (e.g., mini-puzzles) may be iterative. For example, the language games may begin as easy, and then may get harder as the player gets better. In an implementation, computer learning/AI techniques may be leveraged to optimize language learning for the player.

According to aspects, the player may receive in-game rewards for successfully completing the mini-puzzle. For example, the player may be awarded with points, in-game currency, prizes, etc.

In this way, players may learn a foreign language while also playing the video game. This improves player engagement, makes the video game educational, as well as adding another dimension of fun and/or challenge for the player.

Figure 2A:
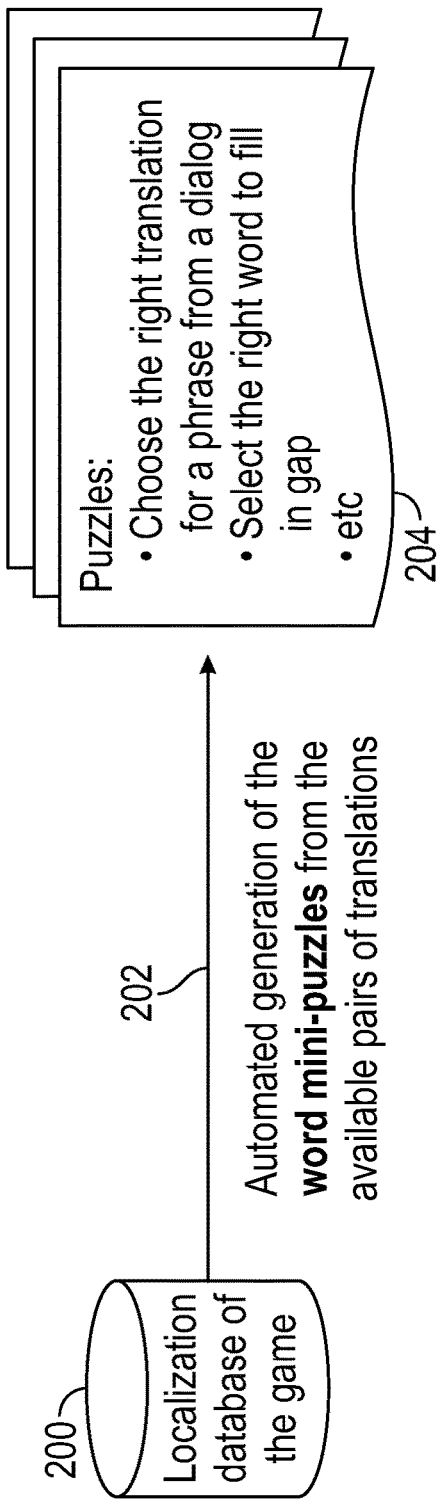
FIG. 2A illustrates an exemplary database for generating word mini-puzzles for learning a foreign language through a video game, according to certain aspects of the present disclosure.

FIG. 2A illustrates an exemplary database 202 for generating word mini-puzzles for learning a foreign language through a video game, according to certain aspects of the present disclosure. The database 202 may include a localization database of the video game. For example, the database 202 may store all dialogue from the video game, as well as translations of the dialogue in foreign languages (e.g., collections of texts). The original dialogue and the foreign language translations may be stored in the database 202 as pairs.

According to aspects, word mini-puzzles 204 may be automatically generated from the available pairs of translations 202. For example, the word mini-puzzles 204 may include choosing the right translation for a phrase from a dialogue, selecting the right word to fill in the blank, etc. It is understood that these are exemplary only, and various other types of word mini-puzzles 204 may be generated without departing from the scope of the disclosure.

According to aspects, the translation pairs may be generated and stored in the database 200 based on a selected foreign language to be learned. For example, if the player wishes to learn Spanish, and the player's native language is English, then the translation pairs may be in Spanish and English. Similarly, other language pairs may be generated based on the player's native language and desired foreign language.

Figure 2B:
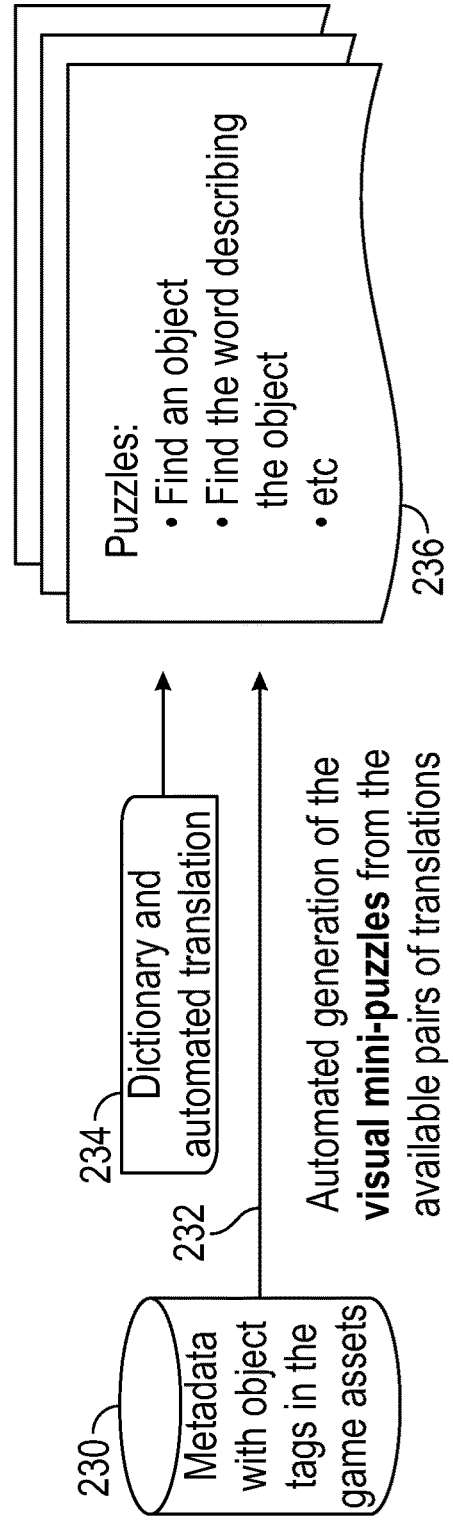
FIG. 2B illustrates an exemplary database for generating visual mini-puzzles for learning a foreign language through a video game, according to certain aspects of the present disclosure.

FIG. 2B illustrates an exemplary database 230 for generating visual mini-puzzles for learning a foreign language through a video game, according to certain aspects of the present disclosure. The database 230 may include metadata with object tags for game assets. For example, each game asset may be given a name to identify it, as well as a translation of that name in a foreign language. The original name and the foreign language name may be stored as pairs in the database 230.

According to aspects, visual mini-puzzles 236 may be automatically generated from the available pairs of translations 232. For example, the visual mini-puzzles 236 may include finding an object, finding the word describing the object, etc. It is understood that these are exemplary only, and various other types of visual mini-puzzles 236 may be generated without departing from the scope of the disclosure.

According to aspects, the translation pairs may be generated and stored in the database 232 based on a selected foreign language to be learned. For example, if the player wishes to learn Spanish, and the player's native language is English, then the translation pairs may be in Spanish and English. Similarly, other language pairs may be generated based on the player's native language and desired foreign language. In an implementation, a dictionary may be utilized to provide automated translation 234 of asset names.

According to aspects, video input may be utilized to verify lips/tongue movement to ensure proper articulation of the words and/or phrases in a language. For example, a video camera may be coupled to the video game system for detecting movement of a user's mouth (e.g., lip movement, tongue movement, etc.). The movement of the user's mouth may be compared to mouth movements correlating with correct pronunciation of words to determine proper articulation of words in the selected foreign language.

Figure 3:
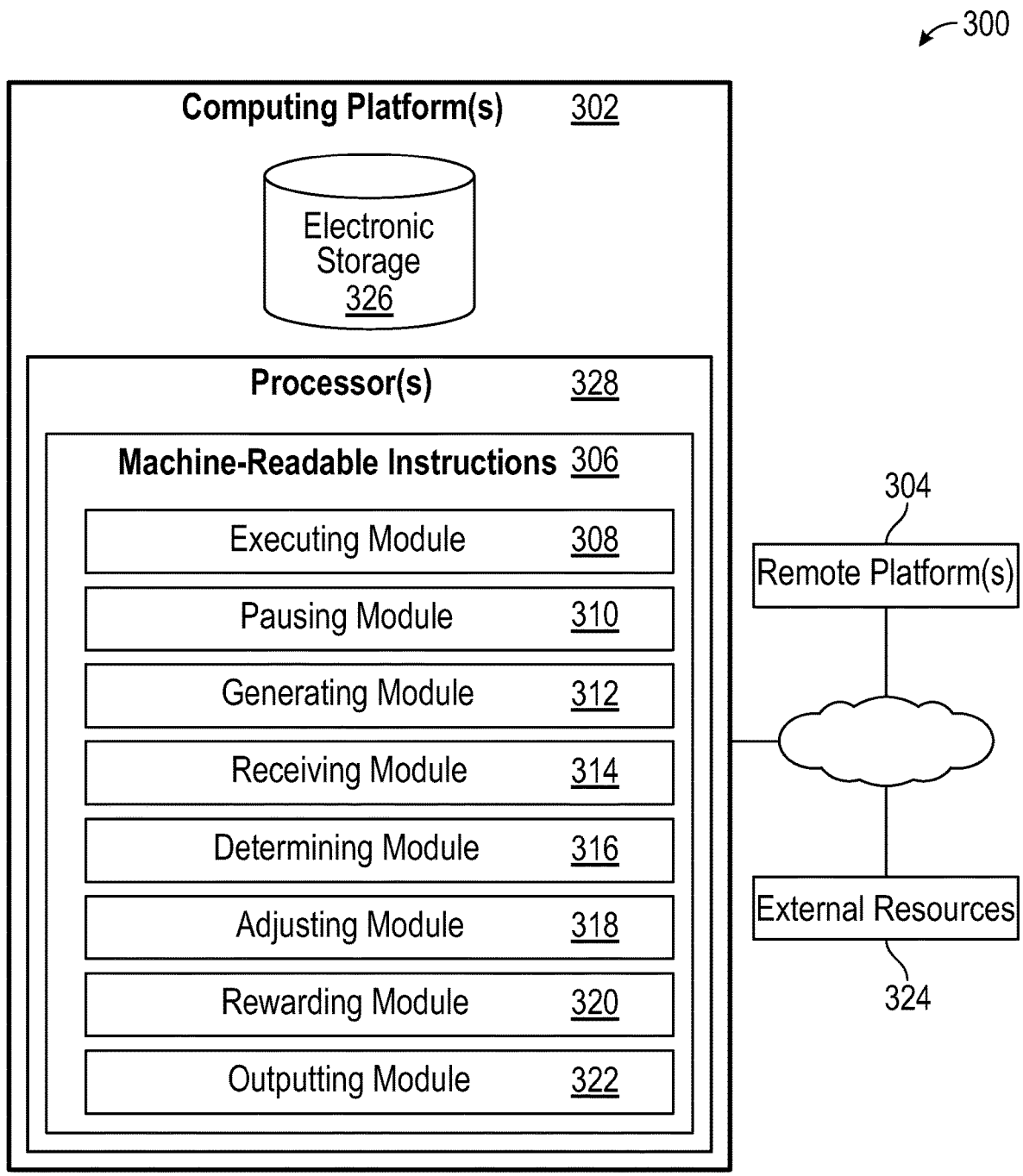
FIG. 3 illustrates a system configured for learning a foreign language through a video game, in accordance with one or more implementations.

FIG. 3 illustrates a system 300 configured for learning a foreign language through a video game, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of executing module 308, pausing module 310, generating module 312, receiving module 314, determining module 316, adjusting module 318, rewarding module 320, and/or outputting module 322, and/or other instruction modules.

Executing module 308 may be configured to execute a video game in a first language.

Pausing module 310 may be configured to pause gameplay of the video game.

For example, the gameplay may be paused by a player or may be a natural pause in a progression of the video game.

Generating module 312 may be configured to generate a mini-puzzle during the pause in the gameplay of the video game, the mini-puzzle comprising a second language different from the first language, the mini-puzzle generated utilizing video game assets. Generating module 312 may also be configured to generate a score for the player based on the response.

Receiving module 314 may be configured to receive a response to the mini-puzzle from a player, the response comprising at least one of the first language and/or the second language.

Determining module 316 may be configured to determine whether the response is correct based on a comparison of the response with translation pairs in a database.

Adjusting module 318 may be configured to adjust a difficulty level of the mini-puzzle based on the score.

Rewarding module 320 may be configured to reward the player based on a correct response.

Outputting module 322 may be configured to cause output of the score through a display.

According to aspects, the mini-puzzle may be generated based on at least one translation pair of the translation pairs of the database. According to aspects, the mini-puzzle may include at least one of a word puzzle and/or a visual puzzle.

According to aspects, the word puzzle may include selecting a correct translation for a phrase, and/or selecting a correct word to fill in a blank. According to aspects, the visual puzzle may include finding an object, and/or finding a word describing the object.

According to aspects, the mini-puzzle may include an edutainment overlay over (e.g., superimposed, replacing, etc.) an on-screen rendering of the video game.

In some implementations, computing platform(s) 302, remote platform(s) 304, and/or external resources 324 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302.

As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software, hardware, firmware, some combination of software, hardware, and/or firmware, and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
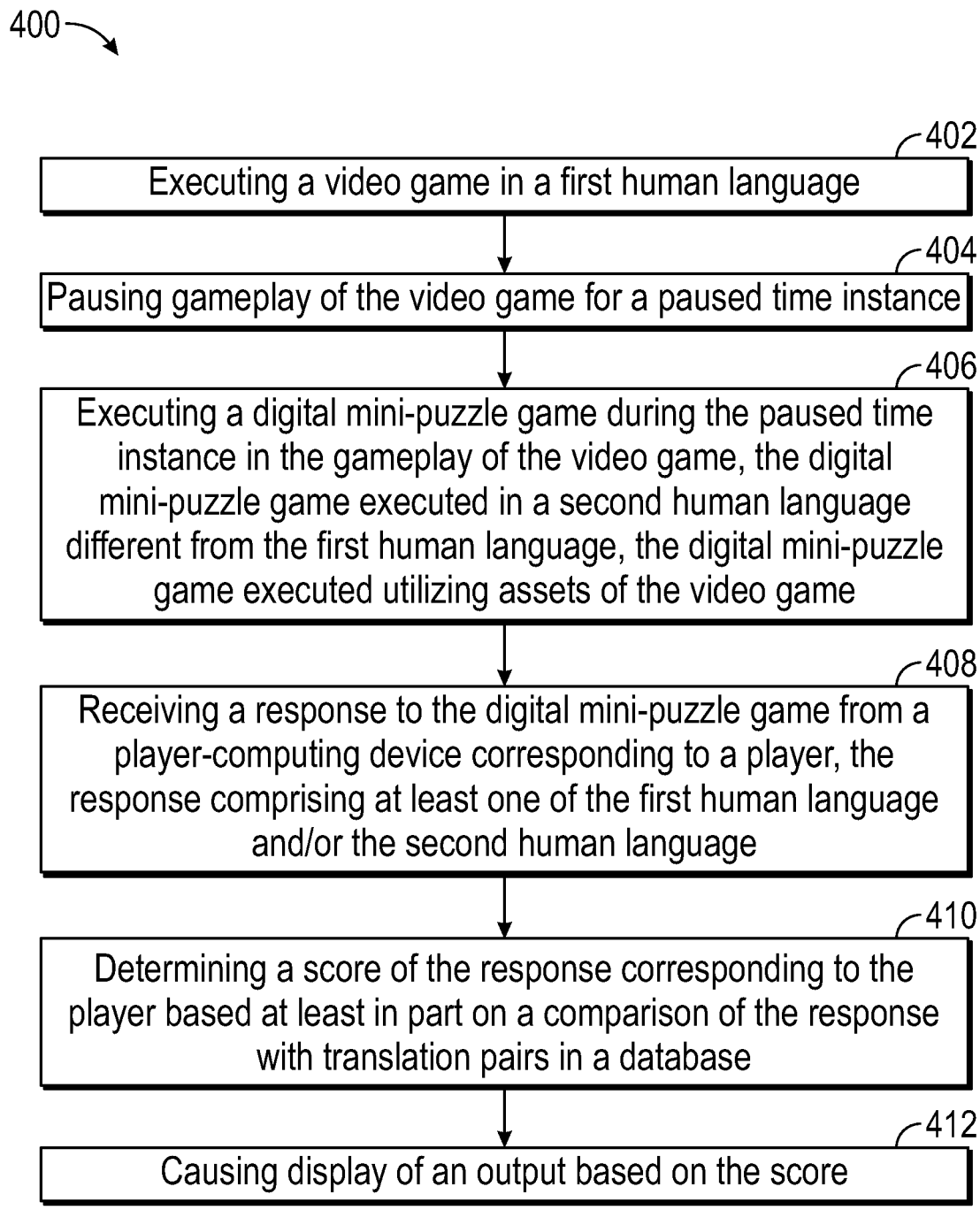
FIG. 4 illustrates an example flow diagram for learning a foreign language through a video game, according to certain aspects of the present disclosure.

FIG. 4 illustrates an example flow diagram (e.g., process 400) for learning a foreign language through a video game, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, a video game is executed in a first human language. For example, the first human language may be a native language of a player.

At step 404, gameplay of the video game is paused for a paused time instance. For example, the gameplay may be paused by a player or may be a natural pause in a progression of the video game.

At step 406, a mini-puzzle (e.g., a digital mini-puzzle game) is executed during the paused time instance in the gameplay of the video game. The mini-puzzle may be executed in a second human language different from the first human language. The mini-puzzle may be executed utilizing assets of the video game.

At step 408, a response to the mini-puzzle is received from a player-computing device corresponding to a player (e.g., an input device corresponding to a player, a computing input device corresponding to a player, and/or the like). The response may include at least one of the first human language and/or the second human language.

At step 410, a score of the response corresponding to the player is determined based at least in part on a comparison of the response with translation pairs in a database. For example, the score may be utilized to determine a difficulty level of the mini-puzzle.

At step 414, an output based on the score is displayed through a display. For example, the display may be a monitor, television, display device, etc.

For example, as described above in relation to FIGS. 1-3, at step 402, a video game is executed in a first human language (e.g., timeline 102, executing module 308). At step 404, gameplay of the video game is paused (e.g., pause 104, pausing module 310) for a paused time instance. At step 406, a mini-puzzle (e.g., word mini-puzzle 204, visual mini-puzzle 236) is executed during the paused time instance in the gameplay of the video game. The mini-puzzle may be executed in a second human language different from the first human language. The mini-puzzle may be executed utilizing assets of the video game (e.g., database 200, database 230). At step 408, a response (e.g., response 108) to the mini-puzzle is received from a player-computing device corresponding to a player. The response may include at least one of the first human language and/or the second human language. At step 410, a score (e.g., score 110) of the response corresponding to the player is determined based at least in part on a comparison of the response with translation pairs in a database (e.g., via determining module 316). At step 412, an output based on the score is displayed through a display (e.g., via outputting module 322).

According to an aspect, the mini-puzzle is generated and executed based on at least one translation pair of the translation pairs of the database.

According to an aspect, the mini-puzzle may include at least one of a word puzzle and/or a visual puzzle.

According to an aspect, the word puzzle may include selecting a correct translation for a phrase, and/or selecting a correct word to fill in a blank.

According to an aspect, the visual puzzle may include finding an object, and/or finding a word describing the object.

According to an aspect, the process 400 further includes adjusting a difficulty level of the mini-puzzle based on the score.

According to an aspect, the process 400 further includes rewarding the player based on a correct response.

According to an aspect, the mini-puzzle may include an edutainment overlay over the video game.

It is understood that a digital mini-puzzle being executed in a human language includes the primary or majority of information (e.g., text, audio, etc.) being output/displayed by the program in that human language, such that the inputs (text, audio) expected and/or prompted for by the program are also in that human language.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 5:
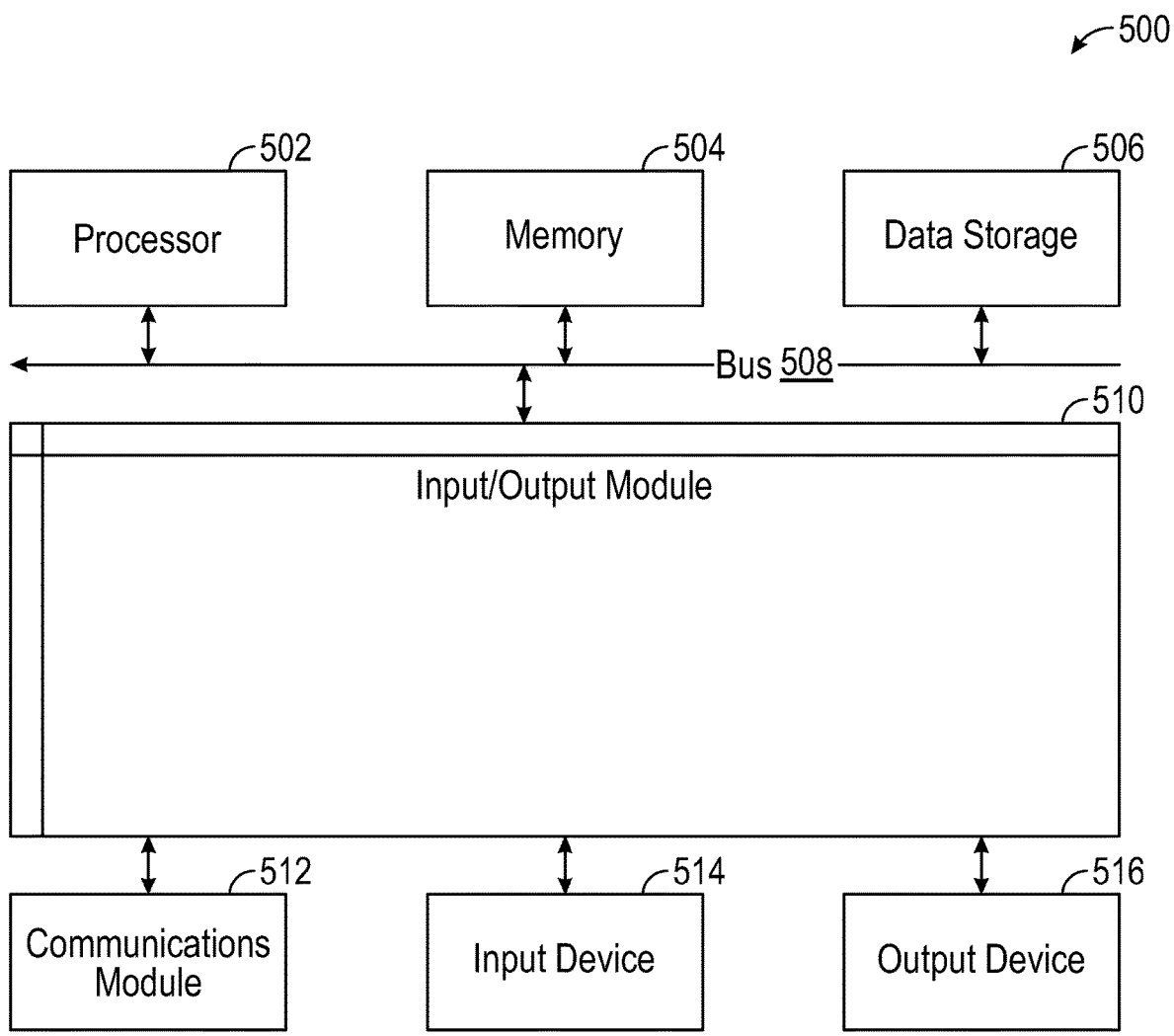
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network, the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for learning a foreign language, comprising:
    executing a video game in a first human language;
    pausing gameplay of the video game for a paused time instance;
    determining a current stop-frame of the video game during the paused timed instance;
    generating, through an augmented game engine, an overlay comprising a digital mini-puzzle game for the current stop-frame of the video game;
    in response to the generating, executing the digital mini-puzzle game during the paused time instance in the gameplay of the video game, the digital mini-puzzle game executed in a second human language different from the first human language, the digital mini-puzzle game executed utilizing assets of the video game, the digital mini-puzzle game comprising at least an audio output and at least one of a word puzzle and/or a visual puzzle, wherein the visual puzzle comprises finding an object, and/or finding a word describing the object, wherein the object is associated with metadata with one of object tags for the assets of the video game;
    receiving a response to the digital mini-puzzle game from a player-computing device corresponding to a player, the response comprising at least one of the first human language and/or the second human language, the response comprising at least an audio input;
    determining a score of the response corresponding to the player based at least in part on a comparison of the response with translation pairs in a database;
    assigning in-game rewards to the player based on the score of the response, the in-game rewards comprising at least one of points and/or in-game currency; and
    causing display of an output based on the score.

2. The computer-implemented method of claim 1, wherein the digital mini-puzzle game is generated based on at least one translation pair of the translation pairs of the database.

3. The computer-implemented method of claim 1, wherein the word puzzle comprises selecting a correct translation for a phrase, and/or selecting a correct word to fill in a blank.

4. The computer-implemented method of claim 1, further comprising:
    adjusting a difficulty level of the digital mini-puzzle game based on the score.

5. The computer-implemented method of claim 1, wherein the digital mini-puzzle game comprises an edutainment overlay over an on-screen rendering of the video game.

6. A system for learning a foreign language, comprising:
    a processor; and
    a memory comprising instructions stored thereon, which when executed by the processor, causes the processor to perform:
        executing a video game in a first human language;
        pausing gameplay of the video game for a paused time instance;
        determining a current stop-frame of the video game during the paused timed instance;
        generating, through an augmented game engine, an overlay comprising a digital mini-puzzle game for the current stop-frame of the video game;
        in response to the generating, executing the digital mini-puzzle game during the paused time instance in the gameplay of the video game, the digital mini-puzzle game executed in a second human language different from the first human language, the digital mini-puzzle game executed utilizing assets of the video game, the digital mini-puzzle game comprising at least an audio output and at least one of a word puzzle and/or a visual puzzle, wherein the visual puzzle comprises finding an object, and/or finding a word describing the object, wherein the object is associated with metadata with one of object tags for the assets of the video game;
        receiving a response to the digital mini-puzzle game from a player-computing device corresponding to a player, the response comprising at least one of the first human language and/or the second human language, the response comprising at least an audio input;
        determining a score of the response corresponding to the player based at least in part on a comparison of the response with translation pairs in a database;
        assigning in-game rewards to the player based on the score of the response, the in-game rewards comprising at least one of points and/or in-game currency; and
        causing display of an output based on the score.

7. The system of claim 6, wherein the digital mini-puzzle game is generated based on at least one translation pair of the translation pairs of the database.

8. The system of claim 6, wherein the word puzzle comprises selecting a correct translation for a phrase, and/or selecting a correct word to fill in a blank.

9. The system of claim 6, further comprising stored sequences of instructions, which when executed by the processor, cause the processor to perform:
    adjusting a difficulty level of the digital mini-puzzle game based on the score.

10. A non-transitory computer-readable storage medium comprising instructions stored thereon, which when executed by one or more processors, cause the one or more processors to perform a method for learning a foreign language, the method comprising:
    executing a video game in a first human language;
    pausing gameplay of the video game for a paused time instance;
    determining a current stop-frame of the video game during the paused timed instance;
    generating, through an augmented game engine, an overlay comprising a digital mini-puzzle game for the current stop-frame of the video game;

in response to the generating, executing the digital mini-puzzle game during the paused time instance in the gameplay of the video game, the digital mini-puzzle game executed in a second human language different from the first human language, the digital mini-puzzle game executed utilizing assets of the video game, the digital mini-puzzle game comprising at least an audio output;

receiving a response to the digital mini-puzzle game from a player-computing device corresponding to a player, the response comprising at least one of the first human language and/or the second human language, the response comprising at least an audio input and at least one of a word puzzle and/or a visual puzzle, wherein the visual puzzle comprises finding an object, and/or finding a word describing the object, wherein the object is associated with metadata with one of object tags for the assets of the video game;

determining a score of the response corresponding to the player based at least in part on a comparison of the response with translation pairs in a database;

assigning in-game rewards to the player based on the score of the response, the in-game rewards comprising at least one of points and/or in-game currency; and causing display of an output based on the score.

11. The non-transitory computer-readable storage medium of claim 10, wherein the digital mini-puzzle game is generated based on at least one translation pair of the translation pairs of the database.

12. The non-transitory computer-readable storage medium of claim 10, wherein the word puzzle comprises selecting a correct translation for a phrase, and/or selecting a correct word to fill in a blank.

* * * * *